United States Patent [19]
Chen

[11] Patent Number: 5,467,465
[45] Date of Patent: Nov. 14, 1995

[54] TWO CLOCK METHOD FOR SYNCHRONIZING A PLURALITY OF IDENTICAL PROCESSORS CONNECTED IN PARALLEL

[75] Inventor: Daniel Chen, Taipei, Taiwan

[73] Assignee: UMAX Data System Inc., Hsinchu, Taiwan

[21] Appl. No.: 153,751

[22] Filed: Nov. 17, 1993

[51] Int. Cl.$^6$ .................................................. G06F 13/42
[52] U.S. Cl. ........................... 395/550; 364/DIG. 1; 364/DIG. 2; 395/650; 395/800
[58] Field of Search ................. 364/230, 230.4, 364/230.5, 230.6, 239, 239.51, 239.9, 942.3–942.6, 948.3, 948.32, 270–270.9, 271, 131, 132, 133, DIG. 1, DIG. 2; 395/550, 650, 800

[56] References Cited

U.S. PATENT DOCUMENTS

| | | | |
|---|---|---|---|
| 4,153,941 | 5/1979 | Caddell | 364/900 |
| 4,351,025 | 9/1982 | Hall, Jr. | 364/200 |
| 5,220,660 | 6/1993 | Yoshizawa et al. | 395/550 |

Primary Examiner—Alyssa H. Bowler
Assistant Examiner—Valerie Darbe
Attorney, Agent, or Firm—W. Wayne Liauh

[57] ABSTRACT

A method to simplify the use of a plurality of identical processors connected in parallel. The method contains the steps of: (a) obtaining a computer system having a CPU and a plurality of identical processors connected in parallel, the processors are also connected to the CPU; (b) obtaining first and second clocks of different oscillation frequencies, wherein the first clock having a slower oscillation frequency than the second clock; (c) connecting the first clock to only one of the plurality of processors and connecting the second clock to the rest of the plurality of processors; and (d) instructing the CPU to check only the processor connected to the first clock, which is connected to the slower clock, for a ready signal, and instructing the CPU to proceed to next step if a ready signal is received from the processor connected to said first clock.

2 Claims, 3 Drawing Sheets

TWO CLOCK METHOD FOR SYNCHRONIZING A PLURALITY OF IDENTICAL PROCESSORS CONNECTED IN PARALLEL

BACKGROUND OF THE INVENTION

As a result of the rapid development of the semi-conductor technology, the current computer has assumed a rather important role because it improves our work efficiency considerably. In real use, a huge quantity of data has to be processed and operated (such as image processing). In order to elevate the performance speed, a plurality of identical processors for parallel operation have been used in the current computer system.

Usually, when a CPU controls a plurality of processors in parallel, the CPU has to continuously check whether all processors have completed their operation before issuing a next instruction to them. The system otherwise might suffer from a downtime because of some processors having slower operation and not being set in ready condition. Conventionally, the design of a plurality of processors connected in parallel (as shown in FIG. 1) uses a clock 10 as a time sequence control means for all processors (for example, three processors); the CPU 20 has to check the flags of all processors continuously so as to keep the conditions updated for effective control thereof. Since the CPU has to check all processors one by one, the CPU would suffer from a heavy work load. In other words, the CPU of the prior art wastes a lot time servicing the whole system while still working at lower operating levels.

Therefore, the drawbacks of the aforesaid conventional parallel processors inspired the inventor's interest in developing the present invention, which can minimize the check work to all processors by CPU so as to elevate the performance of system in operation.

SUMMARY OF THE INVENTION

This invention relates to a simple method for using a plurality of identical processors connected in parallel, and it is deemed a novel method for a CPU to control a plurality of processors in computer parallel processing. The prime feature of the present invention is that the clock signal generator circuit for the processors in parallel has two different designs, of which one can provide a slower clock signal for a selected processor so as to make sure the designated indicating processor completes operation last, i.e., the CPU merely checks the selected processor to monitor if its operation is completed or not and from it will know the condition of all processors; then, the CPU would have less detection work and therefore a higher operation performance.

Moreover, the prime object of the present invention is to provide a method for controlling a plurality of identical processors connected in parallel, i.e., a computer system is provided with two different clock signals, of which the slower signal is applied to one selected processor. Such processor always completes its operation at the last moment. Then, a CPU can make sure whether all the processors are in ready condition or not by merely checking the selected processor so as to save the check time of the CPU.

DETAILED DESCRIPTION

Figure 1:
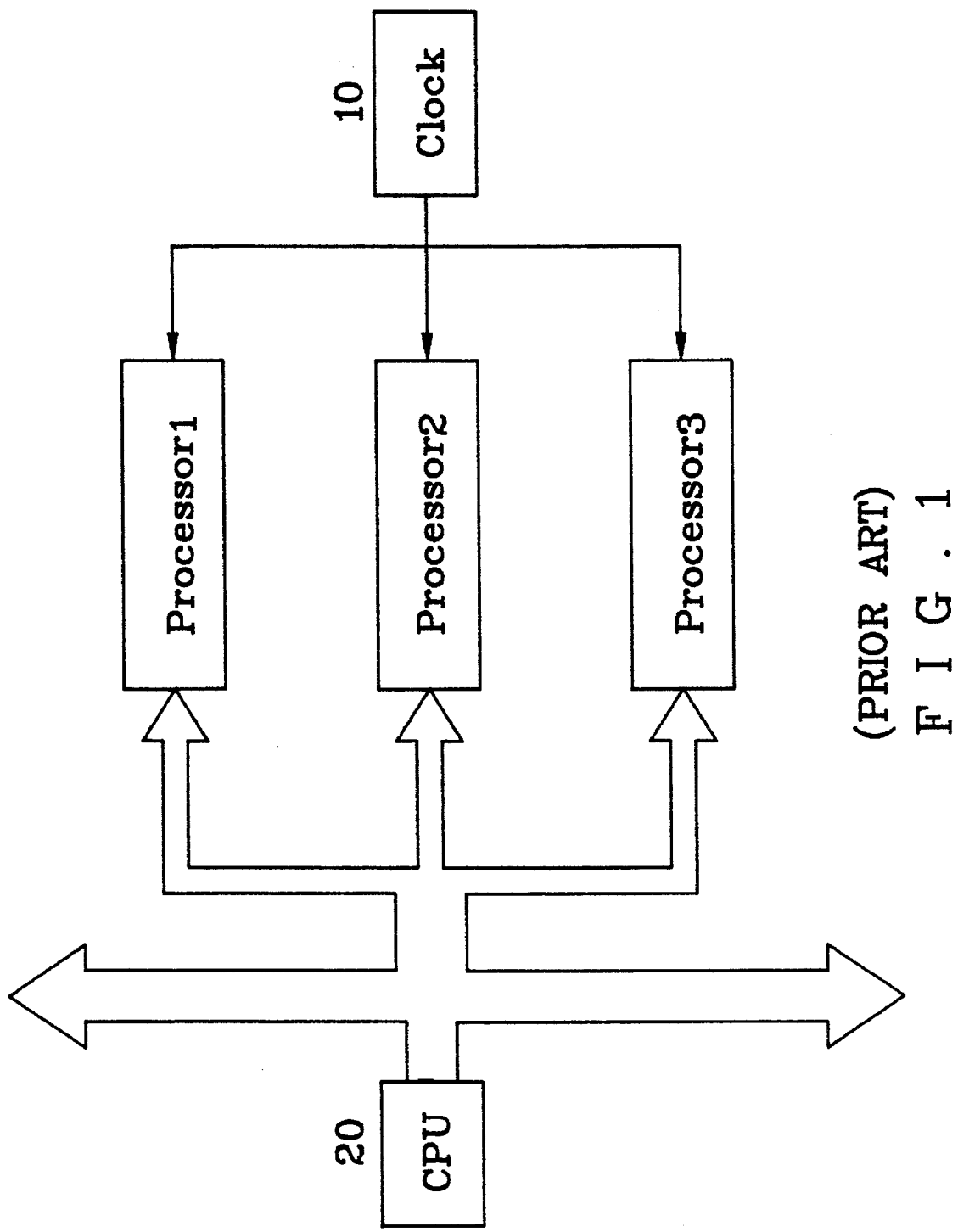
FIG. 1 is a diagram, showing a conventional method of operating a plurality of processors connected in parallel.
Figure 2:
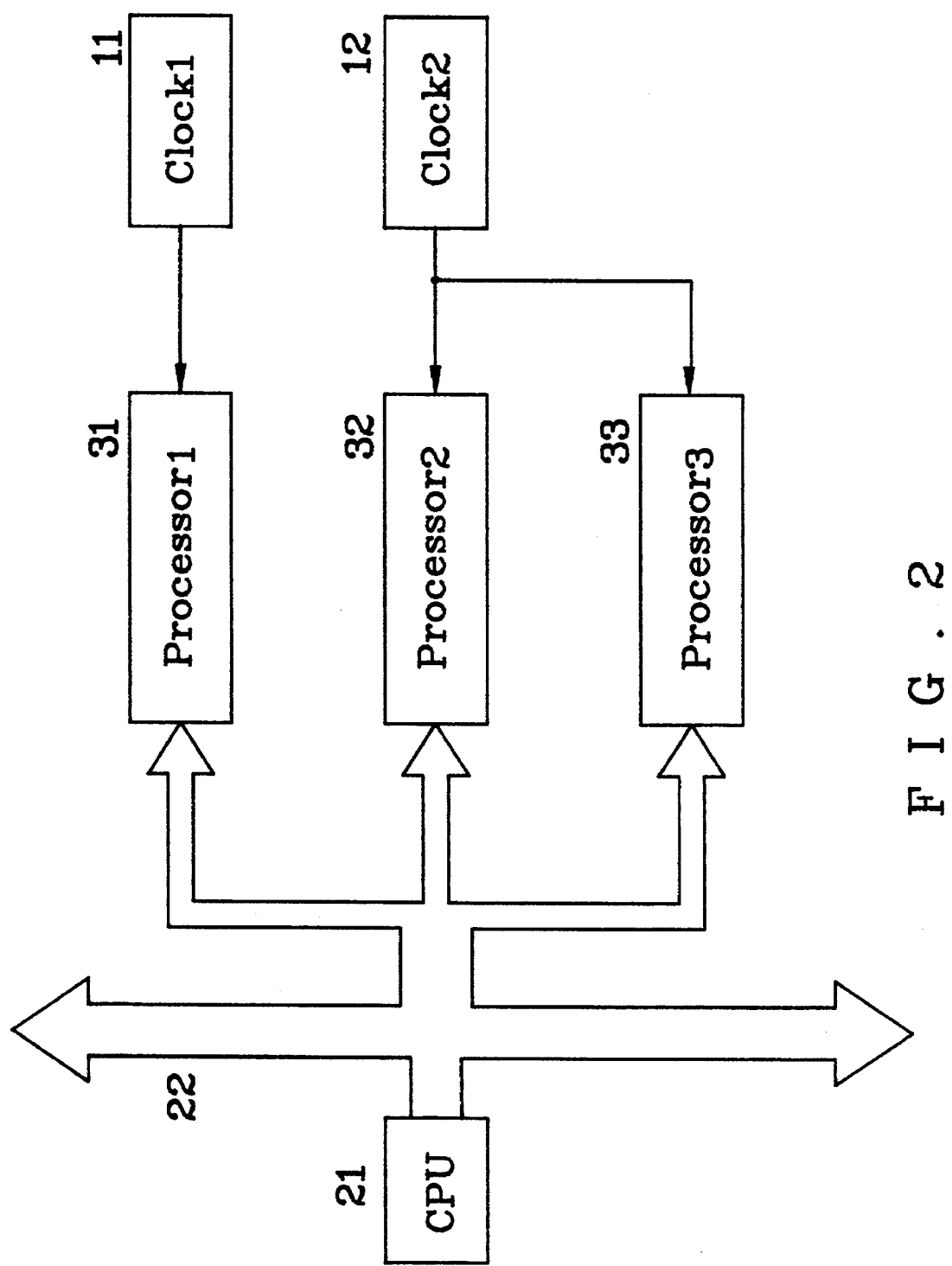
FIG. 2 is a diagram, showing a method of operating a plurality of identical processors connected in parallel according to the present invention.

Referring to FIG. 2, the diagram shows a plurality of identical processors being connected in parallel to operate according to the method of the present invention, in which the CPU 21 can instruct every processors (for example three processors being used) to make the same operation in parallel processing; the processor-1 31 can perform data operation through a time sequence provided by a clock-1 11, while the other processors, such as processor-2 32 and processor-3 33 will receive a time-sequence signal of clock-2 12. The oscillation frequency of the clock-1 11 is designed slightly slower than that of the clock-2 12 (having a difference about 1%–3%). In all parallel processors, the processor-1 31 will be the last one to complete an operation. In real operation, the CPU 21 can confirm the operation condition of all processors by merely checking whether the processor-1 31 has completed its operation or not; therefore, the CPU 21 would save a considerably amount of check work. Result: the performance of a computer will be elevated considerably.

Figure 3:
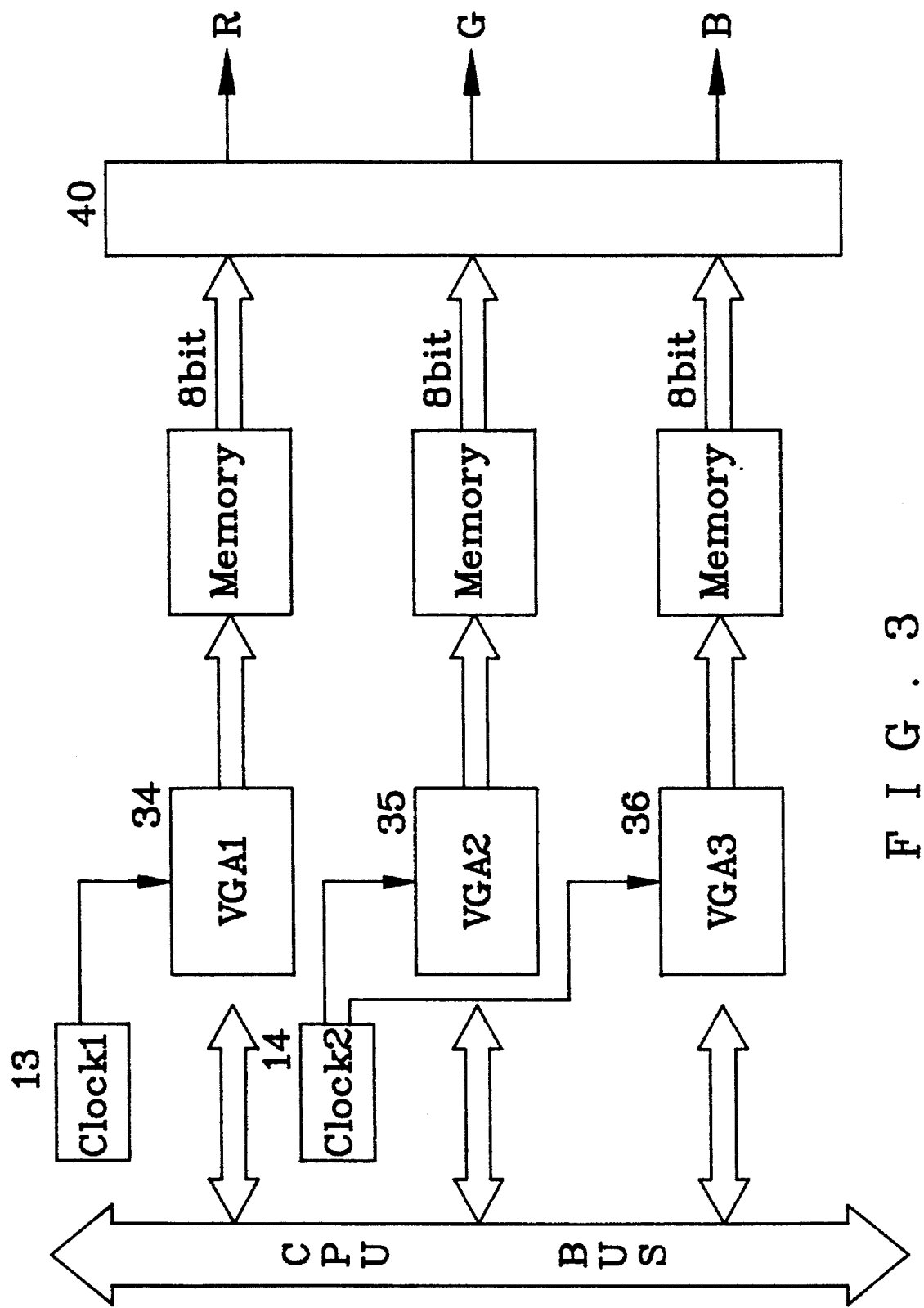
FIG. 3 is a diagram of an embodiment according to the present invention, showing a method of operating a plurality of processors connected in parallel.

The functions and features of the present invention are further indicated in FIG. 3, which is an embodiment for color image processing system so as to augment the selectivity and the solving power of a color display unit. In this embodiment, an advanced method has been used by using a plurality of VGA chips installed in an image-processing interface to provide a parallel and identical process for the image data. In that case, more bits can be provided for the RAMDAC 40 to decode, and to make D-A conversion for output of the three primary colors (red, green and blue). When a CPU controls a plurality of VGA chips and checks the ready conditions thereof, the performance of the system as a whole is reduced. In order to overcome the aforesaid drawback, a plurality of processors connected in parallel according to the present invention are used so as to provide the VGA-1 34 with a slower clock signal by means of the clock-1 13; then, the clock-2 14 will provide the VGA-2 35 and VGA-3 36 with a faster clock signal; in that case, CPU can make sure whether all VGA chips have completed the operation thereof by merely checking the condition of the VGA-1 34. In other words, a drawback which causes the CPU to check every VGA chip repeatedly will be overcome. In real use, th frequencies of two clock signal sources are designed to have a difference from 1% to 3% for obtaining better performance for the system. But if the difference of the two frequencies is too great, the operation speed of the processors will be decreased.

I claim:

1. A method for using a plurality of identical processors connected in parallel, said processors being able to send a ready signal after completing an instruction, and said method comprising the steps of:

(a) obtaining a computer system having a CPU and a plurality of identical processors connected in parallel, said processors also being connected to said CPU;

(b) obtaining first and second clocks of different oscillation frequencies, wherein said first clock being of slower oscillation frequency than said second clock;

(c) connecting said first clock to only one of said plurality of processors and said second clock to rest of said plurality of processors; and (d) instructing said CPU to check only said processor connected to said first clock for said ready signal, and instructing said CPU to proceed to next step if a ready signal is received from said processor connected to said first clock.

2. The method for using a plurality of identical processors connected in parallel as claimed in claim 1, wherein the oscillation frequency of said first clock is 1% to 3% slower than the oscillation frequency of said second clock.

* * * * *